US012647223B2

(12) United States Patent
Shi et al.

(10) Patent No.: US 12,647,223 B2
(45) Date of Patent: Jun. 2, 2026

(54) CONFIGURATION OF ASYMMETRIC CARRIER AGGREGATION

(71) Applicant: ZTE Corporation, Shenzhen (CN)

(72) Inventors: Jing Shi, Shenzhen (CN); Xianghui Han, Shenzhen (CN); Xingguang Wei, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 332 days.

(21) Appl. No.: 18/533,861

(22) Filed: Dec. 8, 2023

(65) Prior Publication Data

US 2024/0178950 A1 May 30, 2024

Related U.S. Application Data

(63) Continuation of application No. PCT/CN2022/087586, filed on Apr. 19, 2022.

(51) Int. Cl.
*H04L 5/00* (2006.01)
*H04L 5/14* (2006.01)

(52) U.S. Cl.
CPC ............ *H04L 5/001* (2013.01); *H04L 5/0098* (2013.01); *H04L 5/14* (2013.01)

(58) Field of Classification Search
CPC .......... H04L 5/14; H04L 5/0098; H04L 5/001
USPC ......................................................... 370/280
See application file for complete search history.

(56) References Cited

U.S. PATENT DOCUMENTS

| | | | | |
|---|---|---|---|---|
| 6,031,827 A | * | 2/2000 | Rikkinen | H04B 7/2656 370/335 |
| 10,271,356 B2 | * | 4/2019 | Lee | H04W 74/0833 |
| 2014/0105153 A1 | * | 4/2014 | Jung | H04W 72/542 370/329 |
| 2014/0126504 A1 | * | 5/2014 | Jung | H04W 74/0816 370/329 |
| 2017/0325123 A1 | * | 11/2017 | Tabet | H04L 5/0087 |
| 2018/0069665 A1 | * | 3/2018 | Lee | H04W 16/14 |
| 2020/0169377 A1 | | 5/2020 | Lee et al. | |

(Continued)

FOREIGN PATENT DOCUMENTS

| | | | | |
|---|---|---|---|---|
| AU | 2021322743 B2 | * | 1/2025 | H04L 1/0061 |
| CN | 113056942 A | | 6/2021 | |

(Continued)

OTHER PUBLICATIONS

Extended European Search Report from EP Application No. 22937754.4 dated Jan. 27, 2025 (11 pages).

(Continued)

*Primary Examiner* — Peter G Solinsky
(74) *Attorney, Agent, or Firm* — Perkins Coie

(57) ABSTRACT

Methods and systems for techniques for configuration of asymmetric carrier aggregation are disclosed. In an implementation, a method of wireless communication includes receiving, by a first communication device, a first message to configure a plurality of cells according to a symmetric carrier aggregation or an asymmetric carrier aggregation, each cell including one or more carriers, or receiving, by the first communication device, the first message and the second message to configure the plurality of cells and activate one or more of the plurality of cells according to a symmetric carrier aggregation or an asymmetric carrier aggregation.

18 Claims, 9 Drawing Sheets

900

Transmit, by a second communication device, a first message to configure a plurality of cells according to a symmetric carrier aggregation or an asymmetric carrier aggregation, each cell including one or more carriers
910

Transmit, by the second communication device, the first message and the second message to configure the plurality of cells and activate one or more of the plurality of cells according to a symmetric carrier aggregation or an asymmetric carrier aggregation
920

(56)        References Cited

U.S. PATENT DOCUMENTS

| | | | |
|---|---|---|---|
| 2021/0227551 A1 | 7/2021 | Ly et al. | |
| 2022/0052820 A1* | 2/2022 | Ling | ......................... H04L 1/18 |
| 2022/0086816 A1 | 3/2022 | Zhang et al. | |
| 2023/0344566 A1 | 10/2023 | Wang et al. | |
| 2025/0055654 A1* | 2/2025 | Ma | ........................ H04L 5/0048 |
| 2025/0056664 A1* | 2/2025 | Lei | .................... H04W 36/0072 |

FOREIGN PATENT DOCUMENTS

| | | | | |
|---|---|---|---|---|
| CN | 113811003 A | 12/2021 | | |
| CN | 114982347 A | 8/2022 | | |
| EP | 4311353 A1 * | 1/2024 | ............ | H04W 72/25 |
| WO | WO-2019066533 A1 * | 4/2019 | ............ | H04W 72/23 |
| WO | 2022055336 A1 | 3/2022 | | |

OTHER PUBLICATIONS

International Search Report and Written Opinion for International Application No. PCT/CN2022/087586, mailed on Dec. 16, 2022 (6 pages).

* cited by examiner

Figure 8:
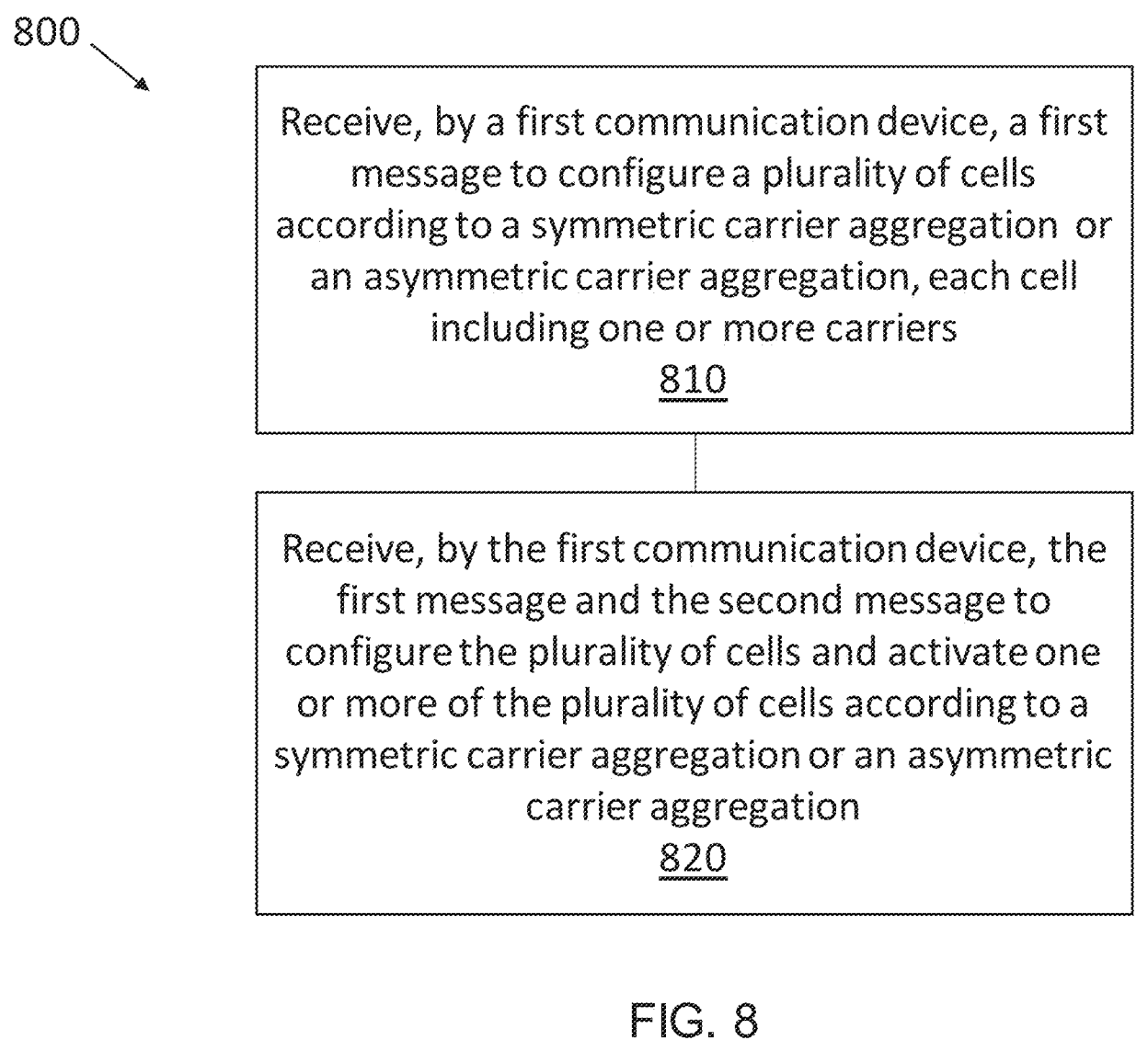

800

Receive, by a first communication device, a first message to configure a plurality of cells according to a symmetric carrier aggregation or an asymmetric carrier aggregation, each cell including one or more carriers

810

Receive, by the first communication device, the first message and the second message to configure the plurality of cells and activate one or more of the plurality of cells according to a symmetric carrier aggregation or an asymmetric carrier aggregation

Figure 9:
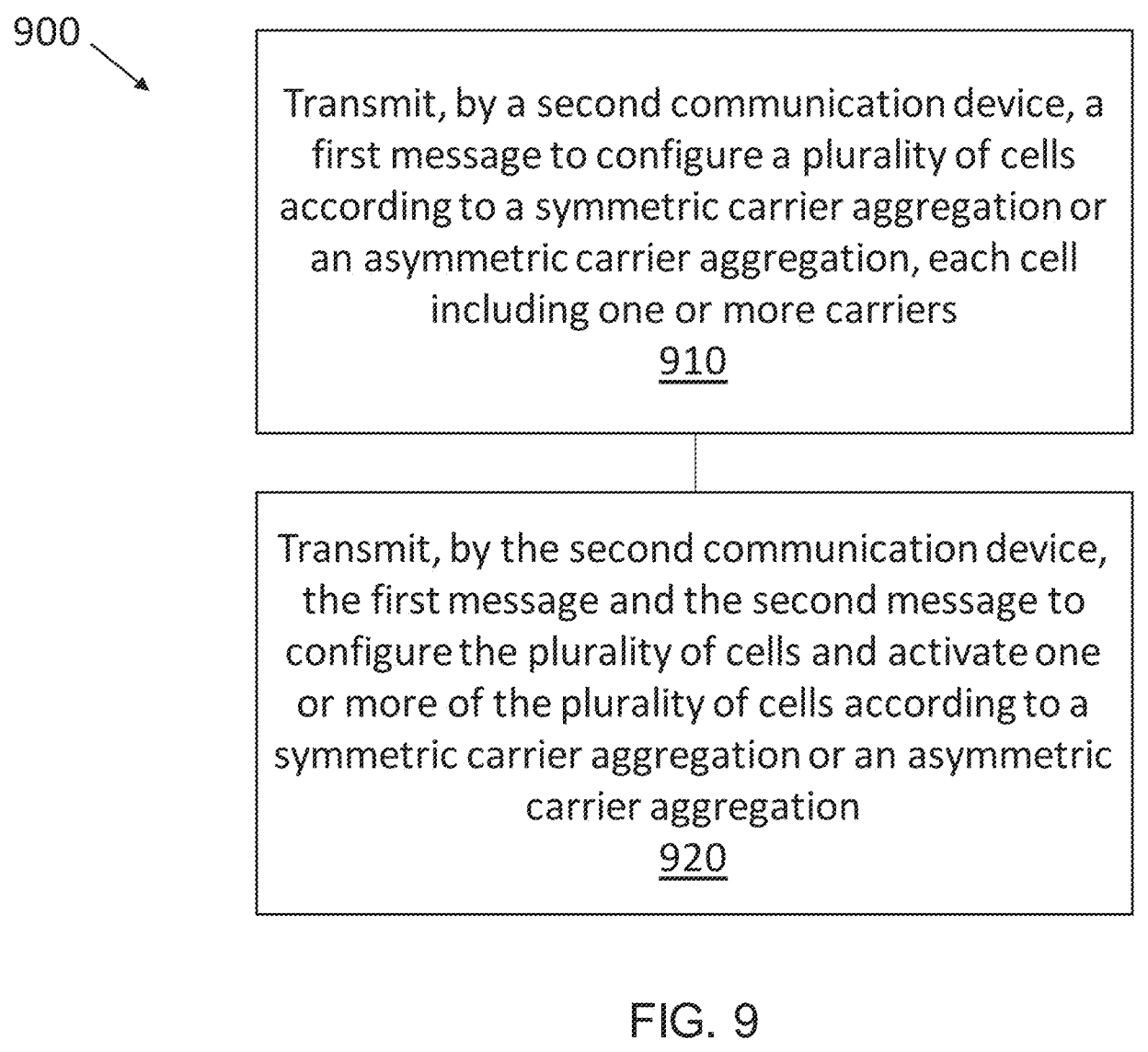

Transmit, by a second communication device, a first message to configure a plurality of cells according to a symmetric carrier aggregation or an asymmetric carrier aggregation, each cell including one or more carriers

910

Transmit, by the second communication device, the first message and the second message to configure the plurality of cells and activate one or more of the plurality of cells according to a symmetric carrier aggregation or an asymmetric carrier aggregation

CONFIGURATION OF ASYMMETRIC CARRIER AGGREGATION

CROSS-REFERENCE TO RELATED APPLICATIONS

This application is a continuation of International Patent Application No. PCT/CN2022/087586, filed on Apr. 19, 2022, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for configuration of asymmetric carrier aggregation.

In one aspect, a method of data communication is disclosed. The method includes receiving, by a first communication device, a first message to configure a plurality of cells according to a symmetric carrier aggregation or an asymmetric carrier aggregation, each cell including one or more carriers, or receiving, by the first communication device, the first message and the second message to configure the plurality of cells and activate one or more of the plurality of cells according to a symmetric carrier aggregation or an asymmetric carrier aggregation.

In another aspect, a method of data communication is disclosed. The method includes transmitting, by a second communication device, a first message to configure a plurality of cells according to a symmetric carrier aggregation or an asymmetric carrier aggregation, each cell including one or more carriers, or transmitting, by the second communication device, the first message and the second message to configure the plurality of cells and activate one or more of the plurality of cells according to a symmetric carrier aggregation or an asymmetric carrier aggregation.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 8 shows an example of a process for wireless communication based on some example embodiments of the disclosed technology.

FIG. 9 shows an example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
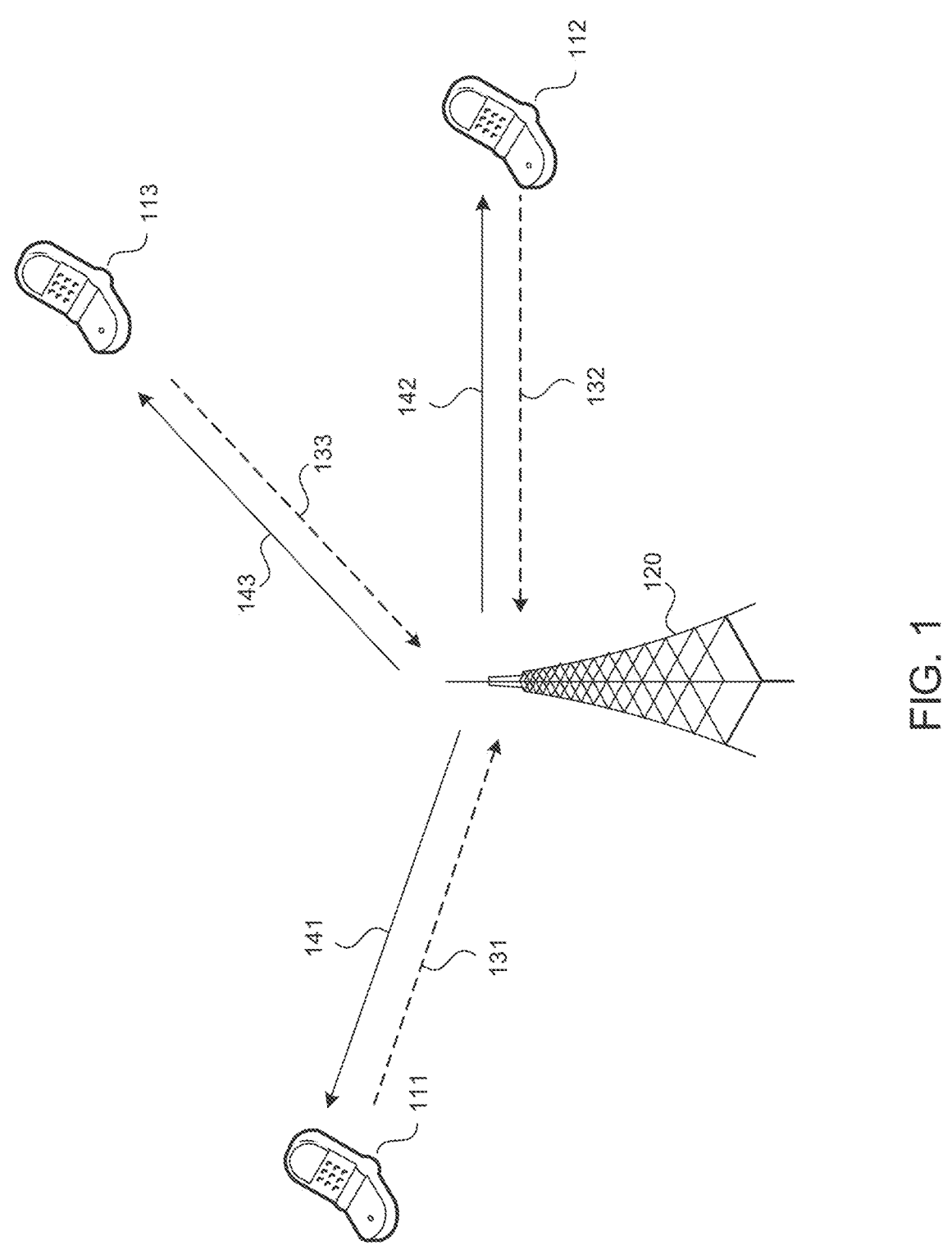
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IOT) device, and so on.

Figure 2:
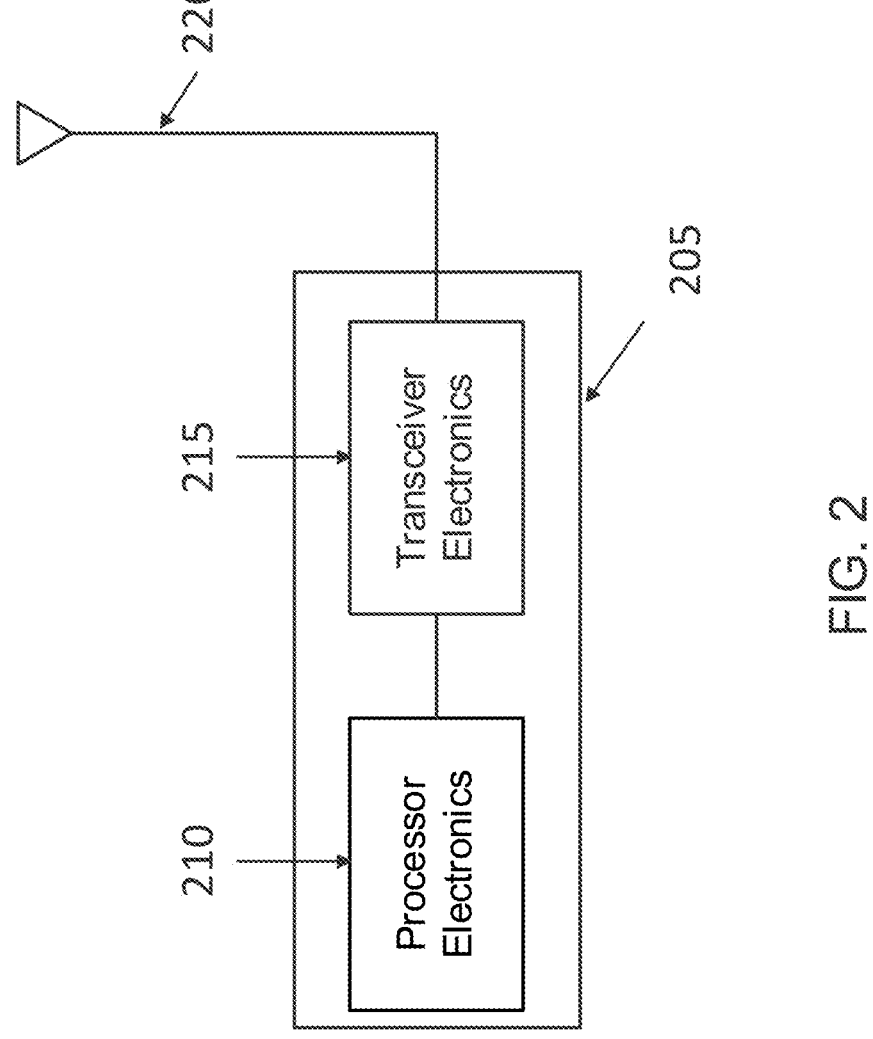
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215.

In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems support features of enhanced mobile broadband (eMBB), ultra-reliable low-latency communication (URLLC), and massive machine-type communication (mMTC). In addition, full-duplex data transmission is a requirement for 5G and other communication systems.

In a wireless communication system, carrier aggregation can increase the data rate when there is no available resource on a single cell. For the traditional network traffic model, downlink (DL) traffic capacity is always larger than uplink (UL) traffic capacity. When carrier aggregation (CA) is used, one or more cells can be configured only with DL component carriers without any UL component carriers. With the enhanced requirement for systems that have a higher UL capacity than DL capacity, such as machine vision systems or video surveillance systems, an asymmetric CA is needed not only for DL heavy traffic scenario (more DL carriers than UL carriers), but also for UL heavy traffic scenario (more UL carriers than DL carriers). The disclosed technology can be implemented in some embodiments to configure the asymmetric CA in a scenario where the number of UL carriers is larger than the number of DL carriers. For example, the disclosed technology can be implemented in some embodiments to configure the asymmetric CA when there is SCell without DL signals or with limited DL signals for network energy saving.

In addition, the disclosed technology can be implemented in some embodiments to define or configure the DL limited signals in a case that there are limited DL signals. DL limited cell is mainly used for SCell which can support all DL signals/channels. For example, a cell can be only with synchronization signal block (SSB), while all DL signals are supported on the anchor cell. Whether to support the necessary DL signals depends on different dedicated requirements, but it is beneficial to avoid power consumption for all or partial DL signal transmissions on some cells in a CA scenario.

The disclosed technology can be implemented in some embodiments (e.g., Embodiments 1-5 discussed below) to achieve an asymmetric CA by configuring legacy cells or asymmetric cells and/or activating legacy CA or asymmetric CA. The disclosed technology can also be implemented in some embodiments (e.g., Embodiments 6-7 discussed below) to achieve limited DL signals on some cells. In some implementations, methods in different embodiments can be combined with each other.

Embodiment 1

Figure 3:
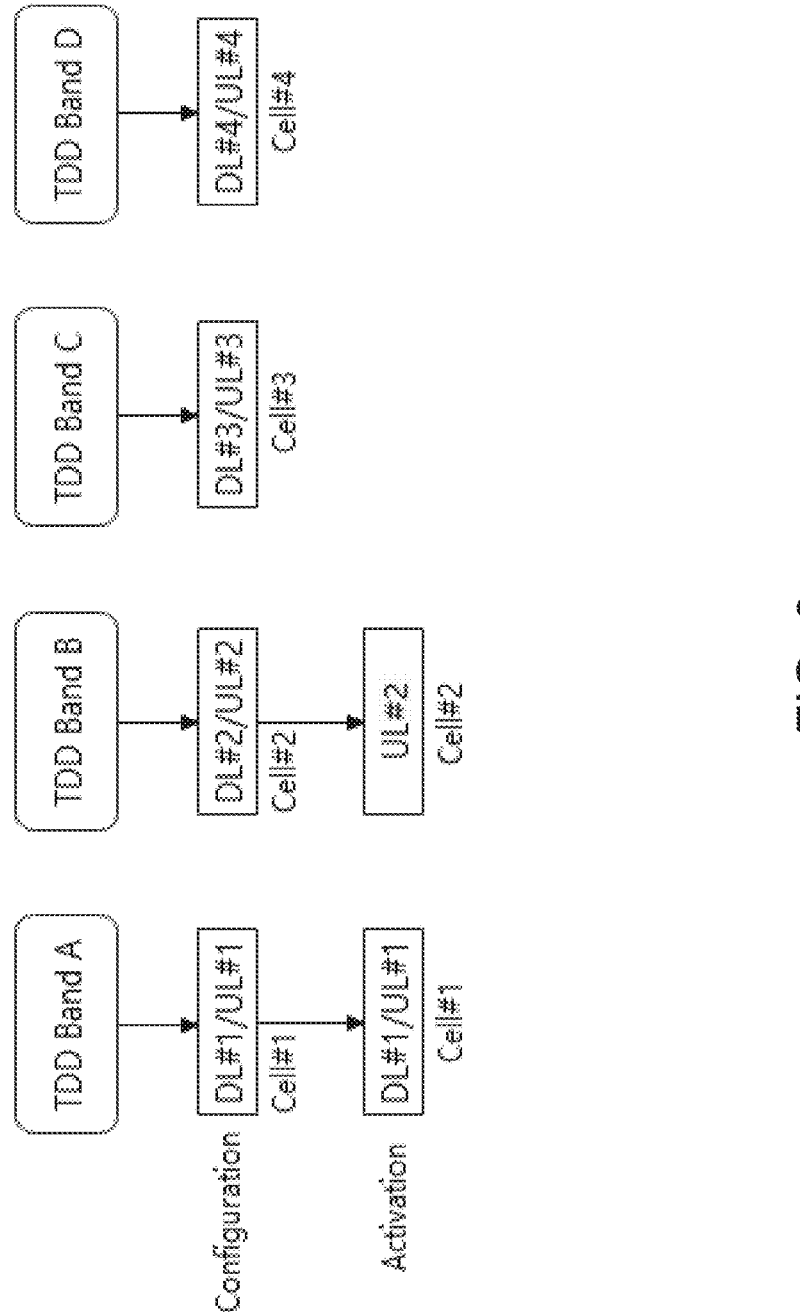
FIG. 3 shows an example of asymmetric carrier aggregation (CA) that can be achieved by configuring legacy cells and activating an asymmetric CA based on some embodiments of the disclosed technology.

FIG. 3 shows an example of asymmetric carrier aggregation (CA) that can be achieved by configuring legacy cells and activating an asymmetric CA based on some embodiments of the disclosed technology.

In some embodiments of the disclosed technology, an asymmetric CA can be achieved by an enhanced CA framework. That is, UL only cell can be implemented in an enhanced CA framework that includes a configuration step and/or an activation step.

Option 1: Configure legacy cell and activate asymmetric CA

As shown in FIG. 3, a legacy cell is configured (e.g., 1DL+1UL), but only UL carrier is activated to achieve UL only cell. The time/frequency synchronization for the UL only cell may use the SSB on the other cell. The configuration and activation can be performed as below.

Step 1: Configure cell #1 (DL #1, UL #1) on band A, cell #2 (DL #2, UL #2) on band B, cell #3 (DL #3, UL #3) on band C, cell #4 (DL #4, UL #4) on band D Step 2: Activate asymmetric CA with cell #1 (DL #1, UL #1) on band A and cell #2 (UL #2) on band B. Optionally Cell #2 is UL only cell, which is a SCell without SSB.

Asymmetric CA may be used by TX switching or network energy saving functions if more UL carriers/cells than DL carriers/cells are needed. In a case that a time division duplex (TDD) frame structure is also configured (optionally before Step 2 above), a different direction resource can be updated by one of the following Alternative 1 to Alternative 4. This can be performed after or with Step 2.

Alternative 1: For Cell #2, semi SFI D (optionally frame structure is configured in Step 1) can be updated or switched (optionally by DCI) to flexible (F) or uplink (U) slots/symbols after/with the activation if only UL carrier is activated. That is, all the resources can be used for UL. For example, "DDDDDDFUUU" for ten slots in one frame is configured for the TDD cell originally, when the only UL carrier/cell is activated, the D slots (optionally also including F slots) will be updated or switched to U or F slots by the activated MAC CE, or a new Medium Access Control (MAC) Control Element (CE), or Downlink Control Information (DCI). Therefore, all the resources can be used for UL transmissions.

Alternative 2: For Cell #2, semi SFI D (optionally frame structure is configured in Step 1) cannot be changed after/with the activation if only UL carrier is activated. However, this semi SFI D will not participate in the collision resolution such as Single TDD Cell case or HD CA case, and not all resources can be used for UL. The only benefit is that the semi SFI D will not have an impact on other UL transmissions. For example, if the Cell #1 is "DFUUUUUUUU" and Cell #2 is "DDDDDDFUUU" which is activated to a UL only cell, then the D slots are deactivated and cannot be used for UL transmissions. For a HD CA UE, in a case of a collision between two cells with different directions, the D slots in Cell #2 can be regarded as invalid and does not participate in the collision resolution.

Alternative 3: Only activate U resource configured by a legacy TDD configuration, or activate all resources as an uplink (U) resource by a new MAC CE which can override the legacy TDD configuration, or activate all resources as U resource by a legacy MAC CE in a case all resources are configured as U resource by a legacy TDD configuration. For example, in a case "DDDDDDFUUU" is configured for Cell #2 by a legacy TDD configuration, only U resource is activated in Step 2, and thus only last 4 or 3 slots can be used for UL transmissions. Alternatively, a new MAC CE can be used to activate all resources as U resource, and thus all slots can be used for UL transmissions.

Alternative 4: For Cell #2, semi SFI D (optionally frame structure is configured in Step 1) can be updated partially after/with the activation if only UL carrier is activated. This is not the UL only cell, but the cell with limited DL signals. The aperiodic DL signal will be also activated with Step 2 and only the resource of the aperiodic DL signal can be the valid D symbols, and other D slots/symbols can be updated to F or U slots/symbols.

In some implementations, Semi SFI D is D symbols configured by TDD-UL-DL-ConfigurationCommon, or TDD-UL-DL-ConfigDedicated. Semi SFI U is U symbols configured by TDD-UL-DL-ConfigurationCommon, or TDD-UL-DL-ConfigDedicated. Wherein TDD-UL-DL-ConfigurationCommon or TDD-UL-DL-ConfigDedicated is the legacy TDD configuration.

The methods implemented based on Embodiment 1 can achieve an asymmetric CA by activating UL only cell from the legacy cell configuration in an asymmetric CA scenario where the number of UL carriers is greater than that of DL, that is, SCell without DL signals, which is beneficial in network energy saving scenarios and UL heavy traffic scenarios.

Embodiment 2

Figure 4:
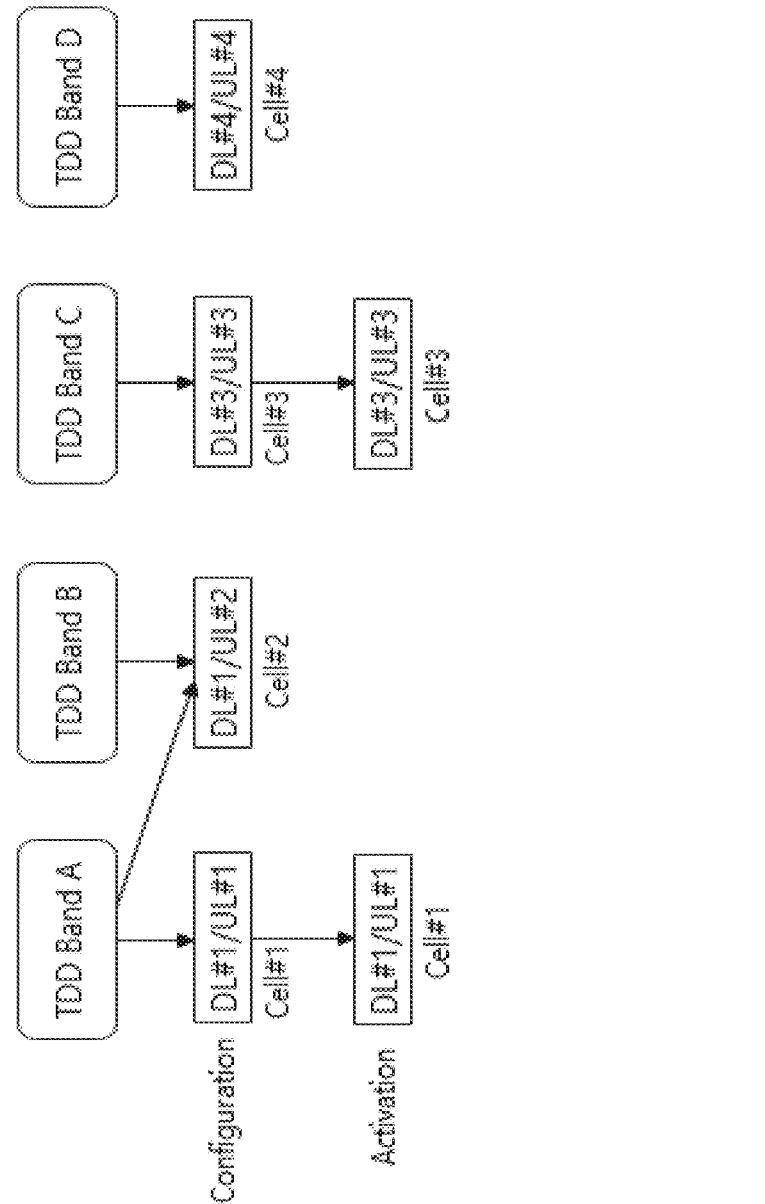
FIG. 4 shows another example of asymmetric CA that can be achieved by configuring asymmetric cells and activating a legacy CA based on some embodiments of the disclosed technology.

FIG. 4 shows another example of asymmetric CA that can be achieved by configuring asymmetric cells and activating a legacy CA based on some embodiments of the disclosed technology.

In some embodiments of the disclosed technology, an asymmetric CA can be achieved by an enhanced CA framework. That is, UL only cell can be implemented in the enhanced CA framework that includes a configuration step and/or an activation step.

Option 2: Configure asymmetric cell and activate legacy CA.

As shown in FIG. 4, an asymmetric CA cell (e.g., 1DL+2UL) is activated to achieve an UL only cell or a DL carrier shared cell, and optionally a legacy cell (1DL+1UL) is activated. The time/frequency synchronization for the UL only cell may use the SSB transmitted on the DL carrier shared cell. The configuration and activation can be performed as below.

Step 1: Configure cell #1 (DL #1, UL #1) on band A, cell #2 (DL #1, UL #2) on band A/B, cell #3 (DL #3, UL #3) on band C, cell #4 (DL #4, UL #4) on band D.

Step 2: Activate legacy CA with cell #1 (DL #1, UL #1) on band A and cell #3 (DL #3, UL #3) on band C. Optionally Cell #2 is UL only cell or a DL shared cell.

Asymmetric CA can be achieved only by the configuration step. The Step 2 can be regarded as a fallback operation, which is optional. That is, the asymmetric CA may fall back to the legacy CA.

In some implementations, a fallback operation may include one of the following operations:

Alternative 1: one cell only with one DL carrier and one UL carrier can be activated. That is, any one of cell #1 and cell #2 can be activated to fall back to the legacy CA combined with cell #3.

Alternative 2: one cell only with one DL carrier and one UL carrier, and from one band, can be activated. That is, only cell #1 can be activated to fall back to the legacy CA combined with cell #3 as shown in FIG. 4.

In some implementations, the time/frequency synchronization for the UL only cell may use the SSB on the other cell. The SSB transmission may include one of the following operations:

Alternative 1: SSB transmitted on one cell can be used for different cells at different locations. For example, SSB can be used ordinally or consecutively one by one, one for cell #1, another for cell #2.

Alternative 2: SSB transmitted on one cell can be used for different cells simultaneously. For example, SSB can be used for cell #1 and cell #2 simultaneously.

Optionally, Alternative 1 can be used with Option 2, and this is simpler for DL synchronization and initial access. Optionally, Alternative 2 can be used with Option 1, and this is mainly used for DL synchronization and RRC connected state.

The methods implemented based on Embodiment 2 can achieve an asymmetric CA by DL shared cell configuration. Fallback operation can be supported by the legacy cell activation from the configured asymmetric CA in an asymmetric CA scenario where the number of UL carriers is greater than that of DL, that is, SCell without DL signals, which is beneficial in network energy saving scenarios and UL heavy traffic scenarios.

Embodiment 3

Figure 5:
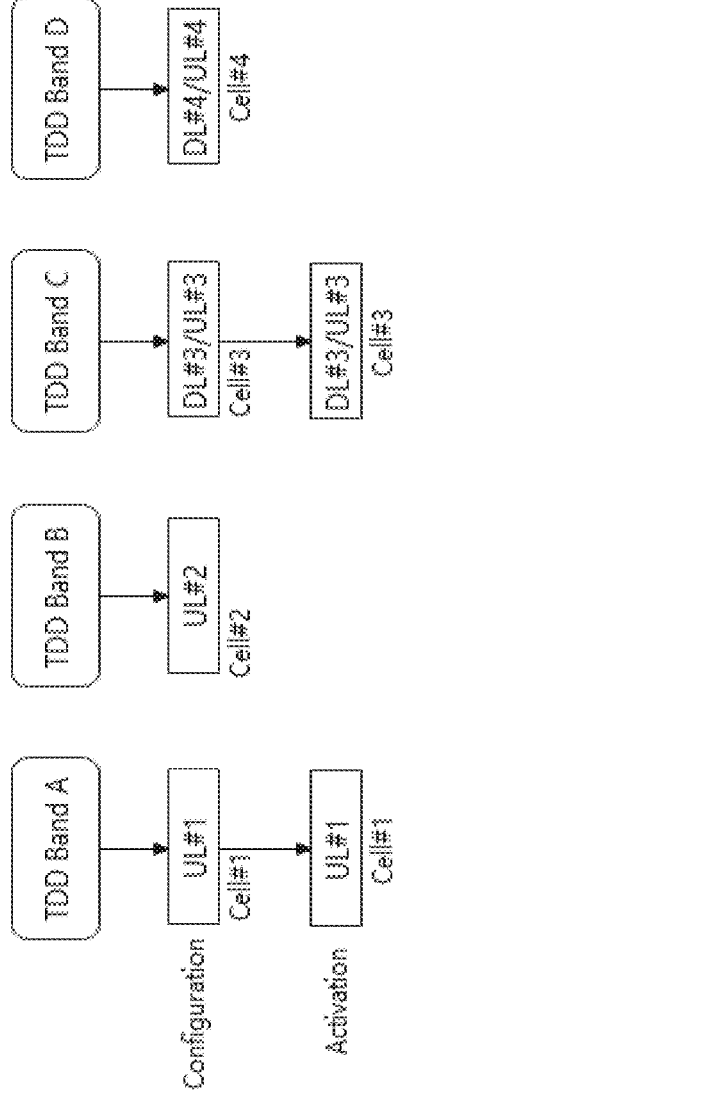
FIG. 5 shows another example of asymmetric CA that can be achieved by configuring asymmetric cells and activating an asymmetric CA based on some embodiments of the disclosed technology.

FIG. 5 shows another example of asymmetric CA that can be achieved by configuring asymmetric cells and activating an asymmetric CA based on some embodiments of the disclosed technology.

In some embodiments of the disclosed technology, an asymmetric CA can be achieved by an enhanced CA framework. That is, UL only cell can be implemented in the enhanced CA framework that includes a configuration step and/or an activation step.

Option 3: Configure asymmetric cell and activate asymmetric CA.

As shown in FIG. 5, any one of configuration (Step 1) and activation (Step 2) can be used to achieve an asymmetric CA. The time/frequency synchronization for the UL only cell may use the SSB on the other cell. The configuration and activation can be performed as below.

Step 1: Configure cell #1 (only UL #1) on band A, cell #2 (only UL #2) on band B, cell #3 (DL #3, UL #3) on band C, cell #4 (DL #4, UL #4) on band D.

Step 2: Activate asymmetric CA with cell #1 (only UL #1) on band A and cell #3 (DL #3, UL #3) on band C.

In some implementations, UL only cell is permitted in any one of configuration and activation. The activation rule is that no DL carrier is permitted, or at least one DL carrier is needed.

Within the restriction of up to 2TX simultaneous transmission for a UE while 3 or 4 bands can be configured from the enhanced Tx switching, any one of the following cell combinations can be activated in addition to FIG. 5: Cell #1 and Cell #3; Cell #1 and Cell #4; Cell #2 and Cell #3; Cell #2 and Cell #4; Cell #3 and Cell #4.

That is, the cell combination Cell #1 and Cell #2 cannot be activated due to the activation rule. In addition, the cell combination Cell #3 and Cell #4 is the legacy CA.

In some implementations, in a case that the TDD frame structure is also configured (optionally before Step 2 above), the different direction resource can be updated by the methods of Embodiment 1. This can be performed after or with Step 2.

In some implementations, the time/frequency synchronization for the UL only cell may use the SSB on the other cell. The SSB transmission may include the methods of Embodiment 2.

The methods implemented based on Embodiment 3 can achieve an asymmetric CA by UL only cell from any of cell activation step or cell configuration step in an asymmetric CA scenario where the number of UL carriers is greater than that of DL, that is, SCell without DL signals, which is beneficial in network energy saving scenarios and UL heavy traffic scenarios.

Embodiment 4

Figure 6:
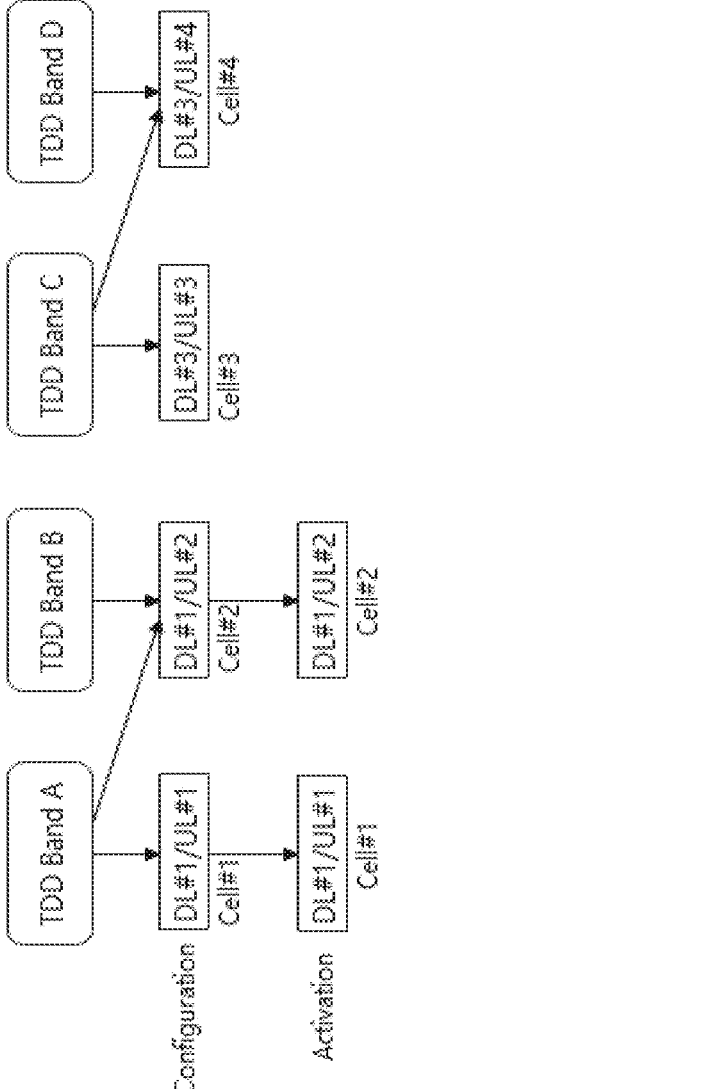
FIG. 6 shows another example of asymmetric CA that can be achieved by configuring asymmetric cells and activating an asymmetric CA based on some embodiments of the disclosed technology.

FIG. 6 shows another example of asymmetric CA that can be achieved by configuring asymmetric cells and activating an asymmetric CA based on some embodiments of the disclosed technology.

In some embodiments of the disclosed technology, an asymmetric CA can be achieved by an enhanced CA framework. That is, UL only cell can be implemented in the enhanced CA framework that includes a configuration step and/or an activation step.

Option 3: Configure asymmetric cell and activate asymmetric CA.

As shown in FIG. 6, any one of configuration (Step 1) and activation (Step 2) can be used to achieve an asymmetric CA. The time/frequency synchronization for the UL only cell could use the SSB on the DL shared carrier. The configuration and activation can be performed as below.

Step 1: Configure cell #1 (DL #1, UL #1) on band A, cell #2 (DL #1, UL #2) on band A/B, cell #3 (DL #3, UL #3) on band C, cell #4 (DL #3, UL #4) on band C/D.

Step 2: Activate asymmetric CA with cell #1 (DL #1, UL #1) on band A and cell #2 (DL #1, UL #2) on band A/B.

In some implementations, DL shared cell is permitted in any one of configuration and activation. The activation rule has no additional restriction.

Within the restriction of up to 2TX simultaneous transmission for a UE while 3 or 4 bands can be configured from the enhanced Tx switching, any one of the following cell combinations can be activated in addition to FIG. 6: Cell #1 and Cell #3; Cell #1 and Cell #4; Cell #2 and Cell #3; Cell #2 and Cell #4; Cell #3 and Cell #4; Cell #1 and Cell #2.

That is, any cell combination can be activated. In addition, the cell combination Cell #1 and Cell #3 is the legacy CA.

In some implementations, in a case that the TDD frame structure is also configured (optionally before Step 2 above), the different direction resource can be updated by the methods of Embodiment 1. This can be performed after or with Step 2.

In some implementations, the time/frequency synchronization for the UL only cell may use the SSB on the DL shared cell. The SSB transmission includes the methods of Embodiment 2.

The methods implemented based on Embodiment 3 can achieve an asymmetric CA by UL only cell from any of cell activation step or cell configuration step in an asymmetric CA scenario where the number of UL carriers is greater than that of DL, that is, SCell without DL signals, which is beneficial in network energy saving scenarios and UL heavy traffic scenarios.

Embodiment 5

Figure 7:
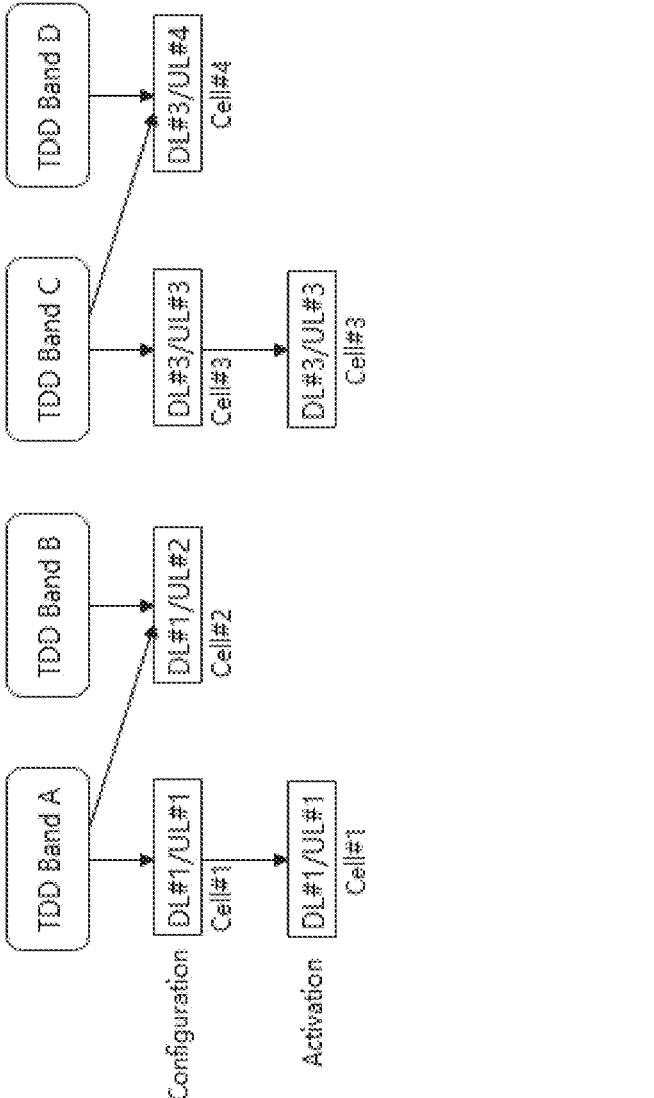
FIG. 7 shows another example of asymmetric CA that can be achieved by configuring asymmetric cells and activating a legacy CA based on some embodiments of the disclosed technology.

FIG. 7 shows another example of asymmetric CA that can be achieved by configuring asymmetric cells and activating a legacy CA based on some embodiments of the disclosed technology.

In some embodiments of the disclosed technology, an asymmetric CA can be achieved by an enhanced CA framework. That is, UL only cell can be implemented in the enhanced CA framework that includes a configuration step and/or an activation step.

Option 2: Configure asymmetric cell and activate legacy CA.

As shown in FIG. 7, an asymmetric CA cell (e.g., 1DL+2UL) is configured to achieve UL only cell or DL carrier shared cell, optionally a legacy cell (1DL+1UL) is activated. The time/frequency synchronization for the UL only cell may use the SSB transmitted on the DL carrier shared cell. The configuration and activation can be performed as below.

Step #1: Configure cell #1 (DL #1, UL #1) on band A, cell #2 (DL #1, UL #2) on band A/B, cell #3 (DL #3, UL #3) on band C, cell #4 (DL #3, UL #4) on band C/D.

Step #2: Activate legacy CA with cell #1 (DL #1, UL #1) on band A and cell #3 (DL #3, UL #3) on band C. Optionally Cell #2 is UL only cell or a DL shared cell.

Within the restriction of up to 2TX simultaneous transmission for a UE while 3 or 4 bands can be configured from the enhanced Tx switching, any one of the following cell combinations can be activated in addition to FIG. 7 assuming a legacy CA is activated: Cell #1 and Cell #3; Cell #1 and Cell #4; Cell #2 and Cell #3; Cell #2 and Cell #4.

In a case that only a legacy CA can be activated without the restriction, any cell combination can be activated.

In some implementations, DL shared cell is permitted in the configuration step. Asymmetric CA can be achieved only by the configuration step. The Step 2 can be regarded as a fallback operation, which is optional. That is, an asymmetric CA may fall back to the legacy CA. The fallback operation methods can be used one of the following operations.

Alternative 1: one cell only with one DL carrier and one UL carrier can be activated. That is, any one of 4 combinations can be activated to fall back to the legacy CA.

Alternative 2: one cell only with one DL carrier and one UL carrier, and from one band, can be activated. That is, only combination cell #1 and cell #3 can be activated to fall back to the legacy CA as shown in FIG. 7.

In some implementations, in a case the TDD frame structure is also configured (optionally before Step 2 above), the different direction resource can be updated by the methods of Embodiment 1. This can be performed after or with Step 2.

In some implementations, the time/frequency synchronization for the UL only cell may use the SSB on the DL shared cell. The SSB transmission may include the methods of Embodiment 2.

The methods implemented based on Embodiment 3 can achieve an asymmetric CA by UL only cell from any of cell activation step or cell configuration step in an asymmetric CA scenario where the number of UL carriers is greater than that of DL, that is, SCell without DL signals, which is beneficial in network energy saving scenarios and UL heavy traffic scenarios.

Embodiment 6

The disclosed technology can be implemented in some embodiments to achieve limited DL signals on some cells in asymmetric CA.

The disclosed technology can be implemented in some embodiments to define or configure the limited DL signals in a case that limited DL signals are introduced. In some implementations, limited DL cell is mainly used for SCell which can support all DL signals/channels. For example, a cell can be only with SSB, while all DL signals are supported on the anchor cell. Whether to support the necessary DL signals depends on different dedicated requirements, but it is beneficial to avoid network power consumption for all or partial DL signals transmissions on some cells in a CA scenario.

The disclosed technology can be implemented in some embodiments to provide sets or levels of limited DL signals as below.

Set 0: SCell without SSB and nothing on DL carrier (can be also referred to as "UL-only Cell"). For example, DL/UL time/frequency synchronization may refer to the SSB transmitted on another cell or the DL shared cell.

Set 1: SCell without SSB and only with some DL aperiodic signals. For example, only A-TRS is used for fast SCell activation, for activating SCell and for UL (heavy) traffic only.

Set 2: SCell without SSB and only with some DL periodic signals. For example, only Physical Downlink Control Channel (PDCCH) is used for self-scheduling Physical Uplink Shared Channel (PUSCH) and for UL (heavy) traffic only.

Set 3: SCell only with SSB. That is SCell with SSB is still needed in inter-band CA.

Set 4: SCell with SSB and DL partial signals. For example, more sets can be defined within this set: Option 1 (Set 4-1): SSB and DL partial signals related to initial access (group common PDCCH/DMRS, Physical Downlink Shared Channel (PDSCH) (SIB/RAR/Paging)/DMRS); the cell is supported for some UE to carry out an initial access; Option 2: SSB and DL partial signals related to unicast transmission. The cell is only used as SCell, which is not used for initial access; Option 2-1 (Set 4-2) SSB+PDCCH, because some UE only supports self-scheduling; Option 2-2 (Set 4-3), a combination of SSB and PDCCH/PDSCH, because some UE only supports self-scheduling, and the SCell is used for both DL and DL traffics; Option 2-3 (Set 4-4), a combination of SSB and PDSCH, because CCS (cross carrier scheduling) is used for the UL traffic on SCell, and the SCell is used for both DL and DL traffic; Option 3 (set 4-5): SSB and all mandatory DL signals, because legacy UE needs to be supported, or for both reasons for Option 1 and Option 2.

Based on the several possible limited DL signals sets, which can optionally correspond to different requirements of limited DL signals and may be reported by different levels of UE capabilities, one or more limited DL signals sets can be defined by one of the following methods.

Method 1: each set of limited DL signals is defined, and gNB can configure one set from several sets of limited DL signals.

Method 2: several modes are defined, with each mode including a group of sets. In addition, one of the following alternatives can be implemented.

Alternative 1: two modes that indicate whether or not to include SSB can be defined. For example, mode A indicate cells without SSB (e.g., sets 0, 1, 2), and mode B indicates cells with SSB (e.g., sets 3, 4)

Alternative 2: two modes that indicate whether or not to include DL signals can be defined. For example, mode A indicate cells without DL signals (e.g., set 0), and mode B indicate cells with DL signals (e.g., sets 1, 2, 3, 4)

Alternative 3: several modes can be defined, with one mode for sub-sets of set 4. For example, mode A indicates set 0, mode B indicates set 1, mode C indicates set 2, mode D indicates set 3, and mode E indicates sub-set of set 4.

Method 3: gNB configures one set/mode based on UE capabilities report. In addition, one of the following alternatives can be implemented.

Alternative 1: UE reports supported set(s)/set combination, and gNB configures one mode, based on a union set of UEs. For example, UE1 reports the capability of set 0, and UE2 reports the capability of set 1 and 2, and then gNB can configure Mode A based on Method 2 Alternative 1.

Alternative 2: UE reports supported mode(s), and gNB configures one set, based on an intersection set of UEs. For example, UE1 reports the capability of all sets, and UE2 reports the capability of set 1 and 2, and then gNB can configure Mode A based on Method 2 Alternative 1.

The methods implemented based on Embodiment 6 define several sets or modes for different requirements to achieve limited DL signals on a cell, and whether to support the necessary DL signals depends on different dedicated requirement, thereby avoiding network power consumption for all or partial DL signals transmission on some cells in a CA scenario.

Embodiment 7

The disclosed technology can be implemented in some embodiments to achieve limited DL signals on some cells in asymmetric CA.

The disclosed technology can be implemented in some embodiments to define or configure the limited DL signals in a case that limited DL signals are introduced. In some implementations, DL limited cell is mainly used for SCell, which can support all DL signals/channels, for example, a cell can be only with SSB, while all DL signals are supported on the anchor cell. Whether to support the necessary DL signals depends on different dedicated requirements, but it is beneficial to avoid network power consumption for all or partial DL signals transmission on some cells in CA scenario.

The disclosed technology can be implemented in some embodiments to provide set or mode switching mechanism based on the limited DL signals sets or modes defined in Embodiment 6:

Option 1: Do not support switching, once used by gNB, then it is fixed. This is based on RAN4 definition or some regulations.

Option 2: It can be determined by gNB configuration. Whether to use a set/mode depends on network implementation (e.g., RRC configuration once) or actual dynamic traffic in network (e.g., RRC reconfiguration)

Option 3: It can be determined by dynamic switch. In addition, one of the following alternatives can be implemented.

Alternative 1: Mode or set switching can be achieved by Cell-specific/GC (Group common)-DCI. This is mainly considered for a cell-specific change manner for the usage of a cell.

Alternative 2: Mode or set switching can be achieved by UE-specific DCI for a UE. This is mainly considered for a cell with a legacy UE and a new UE, and a UL only cell or limited DL signal cell may be supported for a new UE, while a legacy cell may still be used for a legacy UE.

The methods implemented based on Embodiment 7 define several sets or modes for different requirements to achieve limited DL signals on a cell in which the used mode or set can be switched semi-statically or dynamically, and whether to support the necessary DL signals depends on different dedicated requirements, thereby avoiding network power consumption for all or partial DL signals transmission on some cells in a CA scenario.

FIG. 8 shows an example of a process for wireless communication based on some example embodiments of the disclosed technology.

In some embodiments of the disclosed technology, a wireless communication method 800 includes, at 810, receiving, by a first communication device, a first message to configure a plurality of cells according to a symmetric carrier aggregation or an asymmetric carrier aggregation, each cell including one or more carriers, or, at 820, receiving, by the first communication device, the first message and the second message to configure the plurality of cells and activate one or more of the plurality of cells according to a symmetric carrier aggregation or an asymmetric carrier aggregation.

FIG. 9 shows an example of a process for wireless communication based on some example embodiments of the disclosed technology.

In some embodiments of the disclosed technology, a wireless communication method 900 includes, at 910, transmitting, by a second communication device, a first message to configure a plurality of cells according to a symmetric carrier aggregation or an asymmetric carrier aggregation, each cell including one or more carriers; or, at 920, transmitting, by the second communication device, the first message and the second message to configure the plurality of cells and activate one or more of the plurality of cells according to a symmetric carrier aggregation or an asymmetric carrier aggregation.

In some implementations, for symmetric carrier aggregation, each cell includes the same number of downlink carriers and uplink carriers, e.g., one downlink carrier and one uplink carrier. In some implementations, for asymmetric carrier aggregation, at least one cell includes different number of downlink carrier and uplink carrier, e.g., no downlink carrier and one uplink carrier.

In some implementations, the first message is used to configure at least one of the plurality of cells that includes a first number of uplink carriers and a second number of downlink carriers, and wherein the first number equals to the second number.

In some implementations, the second message is used to activate at least one of the configured cells according to the asymmetric carrier aggregation, wherein the activating of the at least one of the configured cells according to the asymmetric carrier aggregation includes at least one of: activating a larger number of uplink carriers than downlink carriers; activating a larger number of downlink carriers than uplink carriers; activating one or more uplink carriers without downlink carrier; or activating one or more downlink carriers without uplink carrier.

In some implementations, the first communication device includes user equipment (UE) and the second communication device includes a base station (e.g., gNB).

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: receiving, by a first communication device, a first message to configure a plurality of cells according to a symmetric carrier aggregation or an asymmetric carrier aggregation, each cell including one or more carriers; or receiving, by the first communication device, the first message and the second message to configure the plurality of cells and activate one or more of the plurality of cells according to a symmetric carrier aggregation or an asymmetric carrier aggregation.

In some implementations, for symmetric carrier aggregation, each cell includes the same number of downlink carriers and uplink carriers, e.g., one downlink carrier and one uplink carrier. In some implementations, for asymmetric carrier aggregation, at least one cell includes different number of downlink carrier and uplink carrier, e.g., no downlink carrier and one uplink carrier.

Clause 2. A method of wireless communication, comprising: transmitting, by a second communication device, a first message to configure a plurality of cells according to a symmetric carrier aggregation or an asymmetric carrier aggregation, each cell including one or more carriers; or transmitting, by the second communication device, the first message and the second message to configure the plurality of cells and activate one or more of the plurality of cells according to a symmetric carrier aggregation or an asymmetric carrier aggregation.

Clause 3. The method of clause 1 or 2, wherein the first message is used to configure at least one of the plurality of cells that includes a first number of uplink carriers and a second number of downlink carriers, and wherein the first number equals to the second number.

Clause 4. The method of clause 3, wherein the second message is used to activate at least one of the configured cells according to the asymmetric carrier aggregation, wherein the activating of the at least one of the configured cells according to the asymmetric carrier aggregation includes at least one of: activating a larger number of uplink carriers than downlink carriers; activating a larger number of downlink carriers than uplink carriers; activating one or more uplink carriers without downlink carrier; or activating one or more downlink carriers without uplink carrier.

Clause 5. The method of any of clauses 3-4, further comprising, for a cell in which a time division duplex (TDD) frame structure is configured and only an uplink carrier is activated, updating the frame structure, wherein the updating of the frame structure includes at least one of: updating all the downlink slots and symbols to flexible slots or symbols, or uplink slots or symbols; updating part of downlink slots and symbols to flexible slots or symbols, or uplink slots or symbols; deactivating part or all of downlink slots and symbols;

activating only uplink slots and symbols; or activating all slots and symbols as uplink slots and symbols.

Clause 6. The method of clause 5, wherein the frame structure is updated by using radio resource control (RRC) or medium access control (MAC) control element (CE) or downlink control information (DCI), after or concurrently with the receiving or transmitting of the second message.

Clause 7. The method of clause 1 or 2, wherein the first message is used to configure at least two of the plurality of cells that includes a shared downlink carrier.

Clause 8. The method of clause 7, wherein the second message is used to activate at least one of the configured cells according to the symmetric carrier aggregation, wherein the at least one of the configured cells includes one downlink carrier and one uplink carrier.

Clause 9. The method of clause 8, wherein the downlink carrier and the uplink carrier in the at least one of the configured cells belong to one band, or the downlink carrier and the uplink carrier in the at least one of the configured cells belong to different bands and another cell including the same downlink carrier is not activated.

Clause 10. The method of clause 4 or 7, wherein a synchronization signal block (SSB) transmitted on a cell is used for different cells at different locations or simultaneously.

Clause 11. The method of clause 1 or 2, wherein the first message is used to configure at least one of the plurality of cells that includes only an uplink carrier or the second message is used to activate at least one of the plurality of cells that includes only an uplink carrier, or the first message is used to configure at least two of the plurality of cells that share a same downlink carrier or the second message is used to activate at least two of the plurality of cells that share a same downlink carrier.

Clause 12. The method of clause 11, wherein at least one cell that includes a downlink carrier is activated by the second message.

Clause 13. The method of clause 1 or 2, wherein at least one of the activated cells further includes one or more limited downlink signals that are determined based on: a plurality of sets of limited downlink signals that is predefined or configured and one of candidate sets of limited downlink signals is further configured; or a plurality of modes, each mode including a group of sets; or one set or mode that is determined based on user equipment (UE) capabilities report.

Clause 14. The method of clause 13, wherein the plurality of sets of limited downlink signals includes at least one of: a cell that includes neither SSB nor downlink signal; a cell that includes one or more aperiodic downlink signals without SSB; a cell that includes one or more periodic downlink signals without SSB; a cell includes only SSB; or a cell that includes SSB and downlink partial signals.

Clause 15. The method of clause 13, wherein the plurality of modes further includes at least one of: two modes that define whether to include SSB or not; two modes that define whether to include downlink signals or not; or two or more modes, wherein one of the two or modes is for sub-sets of a set of the cell that includes SSB and downlink partial signals.

Clause 16. The method of clause 13, wherein the one set or mode that is determined based on user equipment capabilities report further includes at least one of: one or more sets or a combination of sets supported by the UE capabilities report, and one mode configured by the second communication device; or one or more modes supported by the UE capabilities report, and one set configured by the second communication device.

Clause 17. The method of any of clauses 13-16, wherein one set or mode is fixed by a network node, or one set or mode is configured by the network node, or one set or mode is switched to another set or mode by the network node.

Clause 18. The method of any of clauses 1-17, wherein the first communication device includes user equipment (UE) and the second communication device includes a base station.

Clause 19. An apparatus for wireless communication comprising a processor that is configured to carry out the method of any of clauses 1 to 18.

Clause 20. A non-transitory computer readable medium having code stored thereon, the code when executed by a processor, causing the processor to implement a method recited in any of clauses 1 to 18.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

receiving, by a first communication device, a first message and a second message to configure a plurality of cells and activate one or more of the plurality of cells according to a symmetric carrier aggregation or an asymmetric carrier aggregation, wherein the first message is used to configure at least one of the plurality of cells that includes a first number of uplink carriers and a second number of downlink carriers, and wherein the first number equals to the second number;

wherein the second message is used to activate at least one of the configured cells according to the asymmetric carrier aggregation, wherein the activating of the at least one of the configured cells according to the asymmetric carrier aggregation includes at least one of:

activating a larger number of uplink carriers than downlink carriers;

activating a larger number of downlink carriers than uplink carriers;

activating one or more uplink carriers without downlink carrier; or activating one or more downlink carriers without uplink carrier.

2. The method of claim 1, further comprising, for a cell in which a time division duplex (TDD) frame structure is configured and only an uplink carrier is activated, updating the frame structure, wherein the updating of the frame structure includes at least one of:

updating all downlink slots and symbols to flexible slots or symbols, or uplink slots or symbols;

updating part of downlink slots and symbols to flexible slots or symbols, or uplink slots or symbols;

deactivating part or all of downlink slots and symbols;

activating only uplink slots and symbols; or activating all slots and symbols as uplink slots and symbols.

3. The method of claim 2, wherein the frame structure is updated by using radio resource control (RRC) or medium access control (MAC) control element (CE) or downlink control information (DCI), after or concurrently with the receiving of the second message.

4. The method of claim 1, wherein the first message is used to configure at least two of the plurality of cells that includes a shared downlink carrier.

5. The method of claim 4, wherein the second message is used to activate at least one of the configured cells according to the symmetric carrier aggregation, wherein the at least one of the configured cells includes one downlink carrier and one uplink carrier.

6. The method of claim 5, wherein the downlink carrier and the uplink carrier in the at least one of the configured cells belong to one band, or the downlink carrier and the uplink carrier in the at least one of the configured cells belong to different bands and another cell including the same downlink carrier is not activated.

7. The method of claim 1, wherein a synchronization signal block (SSB) transmitted on a cell is used for different cells at different locations or simultaneously.

8. The method of claim 1, wherein the first message is used to configure at least one of the plurality of cells that includes only an uplink carrier or the second message is used to activate at least one of the plurality of cells that includes only an uplink carrier, or the first message is used to configure at least two of the plurality of cells that share a same downlink carrier or the second message is used to activate at least two of the plurality of cells that share a same downlink carrier.

9. The method of claim 8, wherein at least one cell that includes a downlink carrier is activated by the second message.

10. The method of claim 1, wherein at least one of the activated cells further includes one or more limited downlink signals that are determined based on: a plurality of sets of limited downlink signals that is predefined or configured and one of candidate sets of limited downlink signals is further configured; or a plurality of modes, each mode including a group of sets; or one set or mode that is determined based on user equipment (UE) capabilities report.

11. The method of claim 10, wherein the plurality of sets of limited downlink signals includes at least one of:

a cell that includes neither SSB nor downlink signal;

a cell that includes one or more aperiodic downlink signals without SSB;

a cell that includes one or more periodic downlink signals without SSB;

a cell includes only SSB; or a cell that includes SSB and downlink partial signals.

12. The method of claim 10, wherein the plurality of modes further includes at least one of:

two modes that define whether to include SSB or not;

two modes that define whether to include downlink signals or not; or two or more modes, wherein one of the two or modes is for sub-sets of a set of the cell that includes SSB and downlink partial signals.

13. The method of claim 10, wherein the one set or mode that is determined based on user equipment capabilities report further includes at least one of:

one or more sets or a combination of sets supported by the UE capabilities report, and one mode configured by the second communication device; or one or more modes supported by the UE capabilities report, and one set configured by the second communication device.

14. A method of wireless communication, comprising:

transmitting, by a second communication device, a first message and a second message to configure a plurality of cells and activate one or more of the plurality of cells according to a symmetric carrier aggregation or an asymmetric carrier aggregation, wherein the first message is used to configure at least one of the plurality of cells that includes a first number of uplink carriers and a second number of downlink carriers, and wherein the first number equals to the second number;

wherein the second message is used to activate at least one of the configured cells according to the asymmetric carrier aggregation, wherein the activating of the at least one of the configured cells according to the asymmetric carrier aggregation includes at least one of:

activating a larger number of uplink carriers than downlink carriers;

activating a larger number of downlink carriers than uplink carriers;

activating one or more uplink carriers without downlink carrier; or activating one or more downlink carriers without uplink carrier.

15. The method of claim 14, further comprising, for a cell in which a time division duplex (TDD) frame structure is configured and only an uplink carrier is activated, updating the frame structure, wherein the updating of the frame structure includes at least one of:

updating all downlink slots and symbols to flexible slots or symbols, or uplink slots or symbols;

updating part of downlink slots and symbols to flexible slots or symbols, or uplink slots or symbols;

deactivating part or all of downlink slots and symbols;

activating only uplink slots and symbols; or activating all slots and symbols as uplink slots and symbols.

16. The method of claim 15, wherein the frame structure is updated by using radio resource control (RRC) or medium access control (MAC) control element (CE) or downlink control information (DCI), after or concurrently with the transmitting of the second message.

17. An apparatus for wireless communication comprising at least one processor that is configured to carry out the method of claim 1.

18. An apparatus for wireless communication comprising at least one processor that is configured to carry out the method of claim 14.

* * * * *